(12) United States Patent
Fang et al.

(10) Patent No.: US 10,349,044 B2
(45) Date of Patent: Jul. 9, 2019

(54) 3D SHUTTER GLASSES AND 3D DISPLAY SYSTEM

(71) Applicant: Shenzhen China Star Optoelectronics Technology Co., Ltd., Shenzhen, Guangdong (CN)

(72) Inventors: Bin Fang, Guangdong (CN); Chih-ming Yang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 716 days.

(21) Appl. No.: 14/406,217

(22) PCT Filed: Nov. 21, 2014

(86) PCT No.: PCT/CN2014/091884
§ 371 (c)(1),
(2) Date: Dec. 7, 2014

(87) PCT Pub. No.: WO2016/074274
PCT Pub. Date: May 19, 2016

(65) Prior Publication Data
US 2016/0286207 A1    Sep. 29, 2016

(30) Foreign Application Priority Data

Nov. 14, 2014 (CN) .......................... 2014 1 0649630

(51) Int. Cl.
*H04N 13/04* (2006.01)
*H04N 13/341* (2018.01)

(52) U.S. Cl.
CPC ..... *H04N 13/341* (2018.05); *H04N 2213/008* (2013.01)

(58) Field of Classification Search
CPC .......... H04N 13/0497; H04N 13/0438; H04N 13/0422; H04N 13/044; H04N 13/0452;
(Continued)

(56) References Cited

U.S. PATENT DOCUMENTS

| | | | |
|---|---|---|---|
| 7,784,934 B2* | 8/2010 | Gauger | G02B 27/2221 351/45 |
| 7,843,636 B2* | 11/2010 | Iwamoto | G02B 27/22 359/462 |
| 8,233,103 B2* | 7/2012 | MacNaughton | H04N 13/0438 345/419 |

(Continued)

FOREIGN PATENT DOCUMENTS

CN           101414425 A    4/2009

*Primary Examiner* — Dave Czekaj
*Assistant Examiner* — Kehinde Abimbola
(74) *Attorney, Agent, or Firm* — Andrew C. Cheng

(57) ABSTRACT

The present invention discloses 3D shutter glasses and a 3D display system. The 3D shutter glasses comprise a left eye glass and a right eye glass, wherein both the left eye glass and the right eye glass comprise a light transmitting hole array, wherein the left eye glass and the right eye glass alternately control the corresponding light transmitting hole array to be sequentially opened according to a first predetermined time to receive left eye data images and right eye data images, and the first predetermined time is a spacing interval of alternately sending the left eye data images and the right eye data images. With the aforesaid procedure, the present invention is capable of effectively relieving the visual fatigue as watching 3D images.

11 Claims, 3 Drawing Sheets

(58) Field of Classification Search
CPC ............... H04N 13/0048; H04N 13/00; H04N 2213/008; H04N 13/0409; H04N 13/0459; H04N 13/0022; H04N 13/0484; H04N 13/0029; H04N 13/0434; H04N 13/0486; H04N 13/0429; H04N 13/0051; H04N 13/0059; H04N 13/04; H04N 2013/0463; H04N 13/0018
See application file for complete search history.

(56) References Cited

U.S. PATENT DOCUMENTS

| | | | | |
|---|---|---|---|---|
| 8,730,416 B2* | 5/2014 | Koyama | ................ | G09G 3/003 349/15 |
| 8,947,779 B2* | 2/2015 | Choi | ................. | G02B 27/2214 359/464 |
| 2008/0018859 A1* | 1/2008 | Gauger | ............. | G02B 27/2221 352/57 |
| 2008/0252977 A1* | 10/2008 | Iwamoto | ............... | G02B 27/22 359/559 |
| 2010/0302136 A1* | 12/2010 | Arcuri | ............... | G02B 27/0093 345/156 |
| 2011/0001808 A1* | 1/2011 | Mentz | ................ | H04N 13/0438 348/59 |
| 2011/0090324 A1* | 4/2011 | Mentz | ................ | H04N 13/0438 348/55 |
| 2011/0187832 A1* | 8/2011 | Yoshida | ................... | A63F 13/02 348/46 |
| 2011/0205347 A1* | 8/2011 | MacNaughton | ... | H04N 13/0438 348/56 |
| 2012/0019908 A1* | 1/2012 | Choi | ................... | G02B 27/2214 359/463 |
| 2012/0154696 A1* | 6/2012 | Koyama | ................ | G09G 3/003 349/15 |
| 2012/0182407 A1* | 7/2012 | Yoshida | ............. | G02B 27/2214 348/54 |
| 2012/0257026 A1* | 10/2012 | Lee | .................... | H04N 13/0438 348/55 |
| 2013/0076874 A1* | 3/2013 | Mentz | ................ | H04N 13/0434 348/51 |
| 2013/0162614 A1* | 6/2013 | MacNaughton | ... | H04N 13/0438 345/208 |
| 2013/0209082 A1* | 8/2013 | Cameron | ............. | H04N 13/025 396/323 |
| 2014/0184762 A1* | 7/2014 | Mentz | ................ | H04N 13/0438 348/56 |

* cited by examiner

3D SHUTTER GLASSES AND 3D DISPLAY SYSTEM

FIELD OF THE INVENTION

The present invention relates to a 3D display field, and more particularly to 3D shutter glasses and a 3D display system.

BACKGROUND OF THE INVENTION

For the people to clearly see an object, twp processes of locating the actual distance of the object to be seen and obtaining the clear image of the object formed on the retina are required in general. These two processes are generally so called convergence eye movement and eyeball adjustment. The eyeball adjustment is the process that the eyeball obtains the clear image of the object by changing the focus. The convergence eye movement is the process that the image of the object is formed right on the concave part of two eyes' macula fovea, i.e. the process that the two eyes locate the distance or depth of focus of the object. Generally, as two health eyes see the object, the convergence and the adjustment of the eyeballs are synchronous. Two eyes can locate the actual distance of object while the two eyes are obtaining the clear image of the object.

When people wears glasses and watches the images displayed by the 3D display screen, the location that the human eyes can obtain the clear image is the surface of the display screen, i.e. the position that the best clarity and resolution of the object can obtained are both the surface of the display screen. For the people to sense the 3D effect, the 3D display utilizes the binocular parallax theory. With a series of post productions to the images, people can sense that the objects are closer or farer to make the human eyes feel the depth of focus.

However, even though after the post productions, the convergence and the adjustment distances of the images shown by the 3D display are different. When people watch the 3D images and find out that the depths of focuses of the object and the currently seen object are different, the human eyes will rotate radially and inwards, i.e. the convergence eye movement. The depths of the focuses of the objects are different, and then, the ranges of the eyeball rotations are different, either. However, in the convergence process, the depth of the focus of the object can be confirmed but in the meantime, the clear image cannot be seen from the surface of the display screen cause of the eyeballs' rotations. Now, the eyeballs will get into the adjustment process for obtaining the clear images from the surface of the display screen. In a normal daily life, the distances of the convergence and the adjustment are the same. People often get dizzy and nausea due to the bad reactions brought by the visual fatigue after a long period of time of watching the 3D images because the conflict of the adjustment and the convergence shows due to the repeated adjustment and convergence. For easing the aforesaid conflict of the adjustment and the convergence, the range of depth of focus is controlled in the 3D image production to relieve the visual fatigue in general.

Nevertheless, such simple control to the range of depth of focus can merely relieve the visual fatigue to a certain extent without the significant improvement. Meanwhile, such fatigue can be light or serious depending on the people's physiques or other factors. Still, people suffer the bad reactions brought by the visual fatigue when they watch the 3D images after a long period of time.

SUMMARY OF THE INVENTION

The technical issue to be solved by the present invention is to provide 3D shutter glasses and a 3D display system to effectively relieve the visual fatigue as watching 3D images.

For solving the aforesaid technical issue, the technical solution employed by the present invention is: to provide 3D shutter glasses, and the 3D shutter glasses comprise a left eye glass and a right eye glass, wherein both the left eye glass and the right eye glass comprise a light transmitting hole array, wherein the left eye glass and the right eye glass alternately control the corresponding light transmitting hole array to be sequentially opened according to a first predetermined time to receive left eye data images and right eye data images, and the first predetermined time is a spacing interval of alternately sending the left eye data images and the right eye data images;

the left eye glass and the right eye glass are opaque except the light transmitting hole arrays;

each light transmitting hole comprises a liquid crystal layer, and the left eye glass and the right eye glass alternately control voltages of the liquid crystal layers to control the each light transmitting hole of the left eye glass and the right eye glass to be sequentially opened according to the first predetermined time.

Both arrangements and amounts of the light transmitting hole arrays of the left eye glass and the right eye glass are the same.

Shapes of the light transmitting holes comprise at least one of bar shaped empty slot, circular hole and square hole.

For solving the aforesaid technical issue, another technical solution employed by the present invention is: to provide 3D shutter glasses, and the 3D shutter glasses comprise a left eye glass and a right eye glass, wherein both the left eye glass and the right eye glass comprise a light transmitting hole array, wherein the left eye glass and the right eye glass alternately control the corresponding light transmitting hole array to be sequentially opened according to a first predetermined time to receive left eye data images and right eye data images, and the first predetermined time is a spacing interval of alternately sending the left eye data images and the right eye data images.

The left eye glass and the right eye glass are opaque except the light transmitting hole arrays.

Both arrangements and amounts of the light transmitting hole arrays of the left eye glass and the right eye glass are the same.

Each light transmitting hole comprises a liquid crystal layer, and the left eye glass and the right eye glass alternately control voltages of the liquid crystal layers to control the each light transmitting hole of the left eye glass and the right eye glass to be sequentially opened according to the first predetermined time.

Shapes of the light transmitting holes comprise at least one of bar shaped empty slot, circular hole and square hole.

For solving the aforesaid technical issue, another technical solution employed by the present invention is: to provide a 3D display system, and wherein the 3D display system comprises a 3D display device and 3D shutter glasses, the 3D display device is positioned in front of the 3D shutter glasses, employed to show 3D data images, and to alternately send left eye data images and right eye data images to the 3D shutter glasses according to a first predetermined time;

the 3D shutter glasses comprise a left eye glass and a right eye glass, wherein both the left eye glass and the right eye glass comprise a light transmitting hole array, wherein the left eye glass and the right eye glass alternately control the corresponding light transmitting hole array to be sequentially opened according to the first predetermined time to receive the left eye data images and the right eye data images, and the first predetermined time is a spacing interval of alternately sending the left eye data images and the right eye data images.

The left eye glass and the right eye glass are opaque except the light transmitting hole arrays.

Both arrangements and amounts of the light transmitting hole arrays of the left eye glass and the right eye glass are the same.

Each light transmitting hole comprises a liquid crystal layer, and the left eye glass and the right eye glass alternately control voltages of the liquid crystal layers to control the each light transmitting hole of the left eye glass and the right eye glass to be sequentially opened according to the first predetermined time.

Shapes of the light transmitting holes comprise at least one of bar shaped empty slot, circular hole and square hole.

The benefits of the present invention are: different from the conditions of the prior arts, both the left eye glass and the right eye glass of the 3D shutter glasses according to the present invention comprise a light transmitting hole array, and the left eye glass and the right eye glass alternately control the corresponding light transmitting hole array to be sequentially opened according to a first predetermined time to receive left eye data images and right eye data images. That is, in every time point, only one light transmitting hole is opened and the left eye and the right eye of people can only see the light transmitted from one point at the same time. The distances of the convergence and the adjustment from this point are equivalent to make the left eye and the right eye of people not have to constantly repeat the adjustment process and the convergence process. Not merely watching the 3D image can be achievable but also the bad reaction brought by the visual fatigue can be effectively relieved. The health of the user can be protected.

DETAILED DESCRIPTION OF PREFERRED EMBODIMENTS

Figure 1:
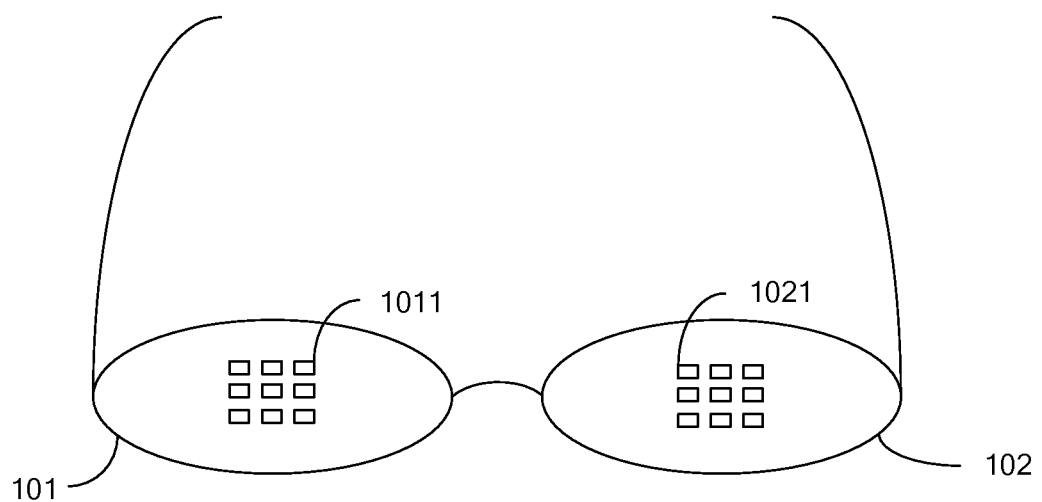
FIG. 1 is a front view structural diagram of 3D shutter glasses according to one embodiment of the present invention.
Figure 2:
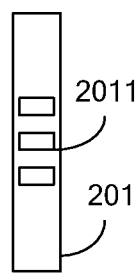
FIG. 2 is a lateral view structural diagram of the 3D shutter glasses according to the embodiment shown in FIG. 1.

Please refer to FIG. 1 and FIG. 2. FIG. 1 is a front view structural diagram of 3D shutter glasses according to one embodiment of the present invention. FIG. 2 is a lateral view structural diagram of the 3D shutter glasses according to the embodiment shown in FIG. 1.

As shown in FIG. 1, the 3D shutter glasses of this embodiment comprise a left eye glass 101 and a right eye glass 102. Both the left eye glass 101 and the right eye glass 102 comprise a light transmitting hole arrays 1011 or 1021.

The glass 201 in FIG. 2 corresponds to the left eye glass 101 (right eye glass 102). The light transmitting hole array 201 corresponds to the light transmitting hole array in FIG. 1.

Furthermore, this embodiment is shown in FIG. 1. The left eye glass 101 and the right eye glass 102 are opaque except the respective light transmitting hole arrays 1011 and 1021 for generating better visual effect. Meanwhile, in this embodiment, the arrangements and amounts of the light transmitting hole arrays 1011, 1021 of the left eye glass 101 and the right eye glass 102 are preferably the same. For instance, a 3×3 array or other arrangement can be illustrated. In other embodiments, the arrangements and amounts of the light transmitting hole arrays of the left eye glass and the right eye glass may be different as long as the alternate open switch of the left and right eyes is achievable.

When the 3D shutter glasses of this embodiment works, the left eye glass 101 and the right eye glass 102 alternately control the corresponding light transmitting hole array to be sequentially opened according to a first predetermined time to receive left eye data images and right eye data images, and the first predetermined time is a spacing interval of alternately sending the left eye data images and the right eye data images.

Specifically, each frame of the 3D images contains a left frame and a right frame which are shot from different angles. The audience can see the 3D images only when the left frame is correspondingly shown through the light transmitting holes of the left eye glass 101 and the right frame is correspondingly shown through the light transmitting holes of the right eye glass 102. Therefore, each light transmitting hole of the left eye glass 101 and the right eye glass 102 in this embodiment comprises a liquid crystal layer, and the left eye glass 101 and the right eye glass 102 alternately control voltages of the liquid crystal layers to control the each light transmitting hole of the left eye glass 101 and the right eye glass 102 to be sequentially opened and closed according to the first predetermined time.

Namely, the 3D shutter glasses further comprises a power source device (not shown). When the power source device applies a voltage to the liquid crystal layer of one light transmitting hole, the transmittance of the light transmitting hole descends and cannot receive the corresponding data images. When the power source device does not apply a voltage to the liquid crystal layer of the light transmitting hole, that is, the light transmitting hole is scanned and the light transmitting hole maintains the normal transmittance to receive the corresponding data images.

Accordingly, the 3D shutter glasses of this embodiment alternately implements scan to each light transmitting hole of the light transmitting hole arrays of the left eye glass 101 and the right eye glass 102 according to the first predetermined time, i.e. alternately control the each light transmitting hole of the left eye glass 101 and the right eye glass 102 to be sequentially opened for allowing the left eye glass 101 and the right eye glass 102 to sequentially and alternately receive the corresponding data images.

Specifically, the first predetermined time is a spacing interval of a 3D display device of alternately sending the left eye data images and the right eye data images. That is, in this embodiment, the alternating frequency of the light transmitting holes of the left eye glass 101 and the right eye glass 102 of the 3D shutter glasses and the switching frequency of the left, right images of the 3D display device are the same.

For instance, for convenience of description, both the light transmitting hole arrays of the left eye glass 101 and the right eye glass 102 comprise 1 column and 3 rows, which respectively are a first light transmitting hole, a second light transmitting hole and a third light transmitting hole for explanation. This embodiment utilizes the principle of light field reconstruction. In every time point, only one light transmitting hole of one glass is opened to receive the corresponding data image.

First, the 3D shutter glasses control the first light transmitting hole of the left eye glass 101 to be opened and other light transmitting holes of the left eye glass 101 and all the light transmitting holes of the right eye glass are closed, i.e. in opaque state. The first light transmitting hole of the left eye glass 101 receives the left eye data image. In the first predetermined time, the first light transmitting hole of the right eye glass 102 is opened, and the first light transmitting hole of the left eye glass 101 is closed. All the other light transmitting holes remain in close state. The first light transmitting hole of the right eye glass 102 receives the right eye data image corresponding to the left eye data image received by the first light transmitting hole of the left eye glass 101.

When people see an object with eyes, the image formation of the object is on the eyeballs with the light principle, and the image formation is transmitted to the brain to sense the image of the object. When the object is disappeared, the image of the object existing in the nervus opticus will not be gone right away but lasts about 0.1 second. The phenomenon of the human eyes is so called the visual staying phenomenon of the eyes. When the left eye data image and the right eye data image are switched in the first predetermined time, the left eye data image has not gone yet because the visual staying effect existing to the left eye. Then the right eye data image which is slightly different from the left eye image appears again. Ultimately, the brain will combine the two images as one image to achieve the 3D visual effect. Then, in the first predetermined time, the second light transmitting hole of the left eye glass 101 is opened, and all the other light transmitting holes are closed to receive the next left eye data image. Then, the second light transmitting hole of the right eye glass 102 is opened to receive the right eye data image corresponding to the left eye data image received by the second light transmitting hole of the left eye glass 101. Ultimately, the brain will combine the left eye data image and the right eye data image to achieve the 3D visual effect. Similarly, what human eyes see is a continuous 3D image because of the visual staying phenomenon.

Accordingly, as the foregoing working process, the third light transmitting hole of the left eye glass 101 and the third light transmitting hole of the right eye glass 102 are sequentially opened. Then, repeatedly, the first light transmitting hole of the left eye glass 101 is opened, and the first light transmitting hole of the right eye glass 102 is opened. In such cycle, the human eyes can see the continuous 3D image. Although the entire display image is lighting, only one light transmitting hole is opened each time, and what the left eye and the right eye of the people see is the light irradiated from some certain point in the space. The distances of the convergence and the adjustment of this certain point are equivalent. The left eye and the right eye of people not have to constantly repeat the adjustment process and the convergence process. The people will not feel the visual fatigue when his eyes see the entire image.

In this embodiment, the shapes of the light transmitting holes comprise at least one of bar shaped empty slot, circular hole and square hole. As shown in FIG. 1 and FIG. 2, the square hole is employed. In other embodiments, the holes or combinations with other shapes can also be utilized. No limitation is described herewith.

In other embodiments, other methods, such as the organic light-emitting diode (OLED) technology can be employed to sequentially open each light transmitting hole of the left eye glass and the right eye glass. No limitation is described herewith.

In other embodiments, other methods, under circumstance that the opening and switching frequency of respective light transmitting holes is fast enough, all the light transmitting holes of the left eye glass are sequentially opened, and then, all the light transmitting holes of the right eye glass are sequentially opened.

Different from the conditions of the prior arts, both the left eye glass and the right eye glass of the 3D shutter glasses according to the present invention comprise a light transmitting hole array, and the left eye glass and the right eye glass alternately control the corresponding light transmitting hole array to be sequentially opened according to a first predetermined time to receive left eye data images and right eye data images. That is, in every time point, only one light transmitting hole is opened and the left eye and the right eye of people can only see the light transmitted from one point at the same time. The distances of the convergence and the adjustment from this point are equivalent to make the left eye and the right eye of people not have to constantly repeat the adjustment process and the convergence process. Not merely watching the 3D image can be achievable but also the bad reaction brought by the visual fatigue can be effectively relieved. The health of the user can be protected.

Figure 3:
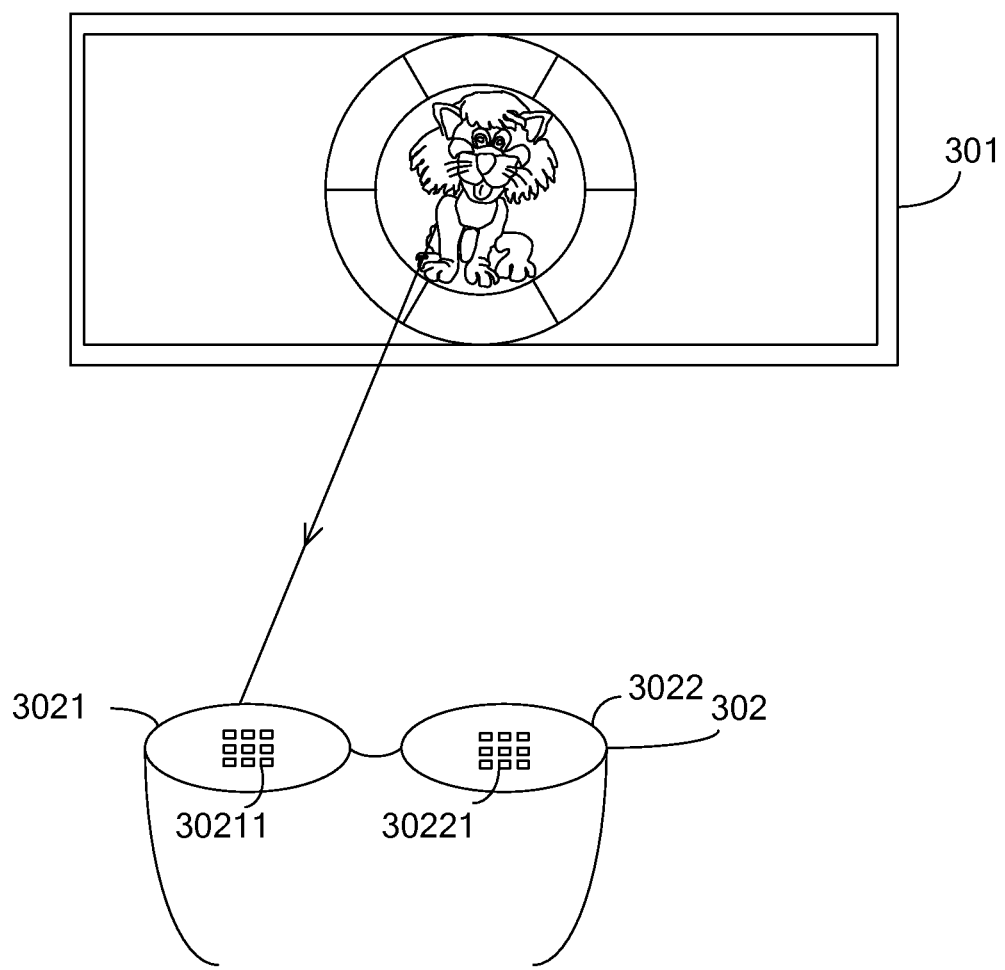
FIG. 3 is a structural diagram of a 3D display system according to one embodiment of the present invention.

As shown in FIG. 3, FIG. 3 is a structural diagram of a 3D display system according to one embodiment of the present invention. The 3D display system of this embodiment comprises a 3D display device 301 and 3D shutter glasses 302.

The 3D display device 301 is positioned in front of the 3D shutter glasses 302, employed to show 3D data images, and to alternately send left eye data images and right eye data images to the 3D shutter glasses according to a first predetermined time.

The 3D shutter glasses 302 are employed to receive the left eye data images and the right eye data images alternately sent by the 3D display device 301. The 3D shutter glasses 302 comprises a left eye glass 3021 and a right eye glass 3022, wherein both the left eye glass 3021 and the right eye glass 3022 comprise a light transmitting hole array 30211 or 30221, wherein the left eye glass 3021 and the right eye glass 3022 alternately control the corresponding light transmitting hole array to be sequentially opened according to the first predetermined time to receive the left eye data images and the right eye data images, and the first predetermined time is a spacing interval of alternately sending the left eye data images and the right eye data images.

In this embodiment, the left eye glass 3021 and the right eye glass 3022 are opaque except the respective light transmitting hole arrays 30211 and 30221 for generating better visual effect. Meanwhile, in this embodiment, the arrangements and amounts of the light transmitting hole arrays 30211 and 30221 of the left eye glass 3021 and the right eye glass 3022 are preferably the same. For instance, a 3×3 array or other arrangement can be illustrated. In other embodiments, the arrangements and amounts of the light transmitting hole arrays of the left eye glass and the right eye glass may be different as long as the alternate open switch of the left and right eyes is achievable.

When the 3D shutter glasses 302 of this embodiment works, the left eye glass 3021 and the right eye glass 3022 alternately control the corresponding light transmitting hole array to be sequentially opened according to a first predetermined time to receive left eye data images and right eye data images, and the first predetermined time is a spacing interval of alternately sending the left eye data images and the right eye data images.

Specifically, each frame of the 3D images contains a left frame and a right frame which are shot from different angles. The audience can see the 3D images only when the left frame transmitted by the 3D display device 301 is correspondingly shown through the light transmitting holes of the left eye glass 3021 and the right frame transmitted by the 3D display device 301 is correspondingly shown through the light transmitting holes of the right eye glass 3022. Therefore, each light transmitting hole of the left eye glass 3021 and the right eye glass 3022 in this embodiment comprises a liquid crystal layer, and the left eye glass 3021 and the right eye glass 102 alternately control voltages of the liquid crystal layers to control the each light transmitting hole of the left eye glass 3021 and the right eye glass 3022 to be sequentially opened and closed according to the first predetermined time.

Namely, the 3D shutter glasses further comprises a power source device (not shown). When the power source device applies a voltage to the liquid crystal layer of one light transmitting hole, the transmittance of the light transmitting hole descends and cannot receive the corresponding data images. When the power source device does not apply a voltage to the liquid crystal layer of the light transmitting hole, that is, the light transmitting hole is scanned and the light transmitting hole maintains the normal transmittance to receive the corresponding data images.

Accordingly, the 3D shutter glasses of this embodiment alternately implements scan to each light transmitting hole of the light transmitting hole arrays of the left eye glass 3021 and the right eye glass 3022 according to the first predetermined time, i.e. alternately control the each light transmitting hole of the left eye glass 3021 and the right eye glass 3022 to be sequentially opened for allowing the left eye glass 3021 and the right eye glass 3022 to sequentially and alternately receive the corresponding data images transmitted by the 3D display device 301.

Specifically, the first predetermined time is a spacing interval of the 3D display device 301 of alternately sending the left eye data images and the right eye data images. That is, in this embodiment, the alternating frequency of the light transmitting holes of the left eye glass 3021 and the right eye glass 3022 of the 3D shutter glasses and the switching frequency of the left, right images of the 3D display device are the same.

For accommodating the left, right eye data images transmitted by the 3D display device 301 and the left, right eye data images received by the 3D shutter glasses to be consistent, i.e. guaranteeing the that the switching frequency of the left, right eye data images of the 3D display device 301 and the switching frequency of the left eye glass 3021 and the right eye glass 3022 of the 3D shutter glasses 302 are the same, a synchronizing signal is required to control the alternation of the two to be consistent. In this embodiment, the infrared ray can be employed to transmit the synchronizing signal. In other embodiments, other method, such as Bluetooth or High frequency radio signal can be considered to transmit the aforesaid synchronizing signal. No limitation is described herewith.

Figure 4:
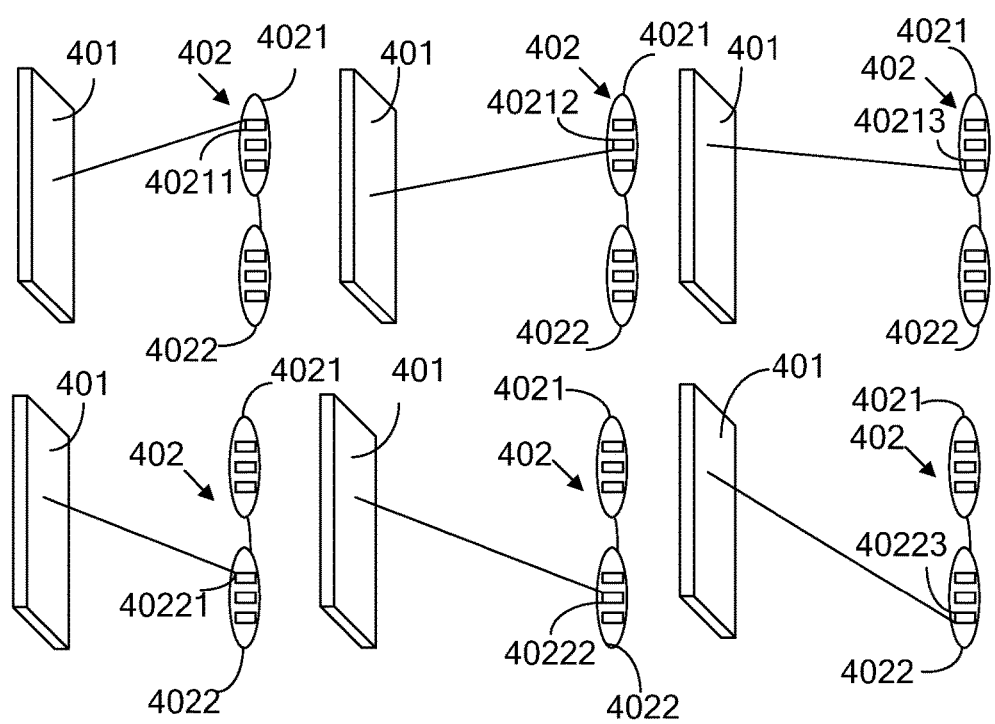
FIG. 4 is a structural diagram of an embodiment depicting the working process of the display system shown in FIG. 3.

For instance, as shown in FIG. 4, FIG. 4 is a structural diagram of an embodiment depicting the working process of the display system shown in FIG. 3. For convenience of description, both the light transmitting hole arrays of the left eye glass 4021 and the right eye glass 4022 comprise 1 column and 3 rows, which respectively are a first light transmitting hole 40211 (40221), a second light transmitting hole 40212 (40222) and a third light transmitting hole 40213 (40223) for explanation. This embodiment utilizes the principle of light field reconstruction. In every time point, only one light transmitting hole of one glass is opened to receive the corresponding data image.

First, when the 3D display device 401 transmits data images to the 3D shutter glasses 402, the 3D shutter glasses 402 controls the first light transmitting hole 40211 of the left eye glass 4021 to be opened and other light transmitting holes of the left eye glass 4021 and all the light transmitting holes of the right eye glass are closed, i.e. in opaque state. The first light transmitting hole 40211 of the left eye glass 4021 receives the left eye data image. In the first predetermined time, the first light transmitting hole 40221 of the right eye glass 4022 is opened, and the first light transmitting hole of the left eye glass 4021 is closed. All the other light transmitting holes remain in close state. The first light transmitting hole 40221 of the right eye glass 4022 receives the right eye data image corresponding to the left eye data image received by the first light transmitting hole of the left eye glass 4021.

When people see an object with eyes, the image formation of the object is on the eyeballs with the light principle, and the image formation is transmitted to the brain to sense the image of the object. When the object is disappeared, the image of the object existing in the nervus opticus will not be gone right away but lasts about 0.1 second. The phenomenon of the human eyes is so called the visual staying phenomenon of the eyes. When the left eye data image and the right eye data image are switched in the first predetermined time, the left eye data image has not gone yet because the visual staying effect existing to the left eye. Then the right eye data image which is slightly different from the left eye image appears again. Ultimately, the brain will combine the two images as one image to achieve the 3D visual effect. Then, in the first predetermined time, the second light transmitting hole 40212 of the left eye glass 4021 is opened, and all the other light transmitting holes are closed to receive the next left eye data image. Then, the second light transmitting hole 40222 of the right eye glass 4022 is opened to receive the right eye data image corresponding to the left eye data image received by the second light transmitting hole 40212 of the left eye glass 4021. Ultimately, the brain will combine the left eye data image and the right eye data image to achieve the 3D visual effect. Similarly, what human eyes see is a continuous 3D image because of the visual staying phenomenon.

Accordingly, as the foregoing working process, the third light transmitting hole 40213 of the left eye glass 4021 and the third light transmitting hole 40223 of the right eye glass 4022 are sequentially opened. Then, repeatedly, the first light transmitting hole 40211 of the left eye glass 4021 is opened, and the first light transmitting hole 40221 of the right eye glass 4022 is opened. In such cycle, the human eyes can see the continuous 3D image. Although the entire display image is lighting, only one light transmitting hole is opened each time, and what the left eye and the right eye of the people see is the light irradiated from some certain point in the space. The distances of the convergence and the adjustment of this certain point are equivalent. The left eye and the right eye of people not have to constantly repeat the adjustment process and the convergence process. The people will not feel the visual fatigue when his eyes see the entire image.

In this embodiment, the shapes of the light transmitting holes comprise at least one of bar shaped empty slot, circular hole and square hole. As shown in FIG. 3 and FIG. 4, the square hole is employed. In other embodiments, the holes or combinations with other shapes can also be utilized. No limitation is described herewith.

In other embodiments, other methods, such as the organic light-emitting diode (OLED) technology can be employed to sequentially open each light transmitting hole of the left eye glass and the right eye glass. No limitation is described herewith.

In other embodiments, other methods, under circumstance that the opening and switching frequency of respective light transmitting holes is fast enough, all the light transmitting holes of the left eye glass are sequentially opened, and then, all the light transmitting holes of the right eye glass are sequentially opened.

Different from the conditions of the prior arts, the 3D display system of this embodiment comprises a 3D display device and 3D shutter glasses. Both the left eye glass and the right eye glass of the 3D shutter glasses according to the present invention comprise a light transmitting hole array, and the left eye glass and the right eye glass alternately control the corresponding light transmitting hole array to be sequentially opened according to a first predetermined time to receive left eye data images and right eye data images. That is, in every time point, only one light transmitting hole is opened and the left eye and the right eye of people can only see the light transmitted from one point at the same time. The distances of the convergence and the adjustment from this point are equivalent to make the left eye and the right eye of people not have to constantly repeat the adjustment process and the convergence process. Not merely watching the 3D image can be achievable but also the bad reaction brought by the visual fatigue can be effectively relieved. The health of the user can be protected.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. 3D shutter glasses, comprising a left eye glass and a right eye glass, wherein both the left eye glass and the right eye glass comprise a light transmitting hole array having a plurality of light transmitting holes, wherein the left eye glass and the right eye glass alternately control the plurality of light transmitting holes of the corresponding light transmitting hole array to be sequentially opened according to a first predetermined time to receive left eye data images and right eye data images, and the first predetermined time is a spacing interval of alternately sending the left eye data images and the right eye data images;

the left eye glass and the right eye glass are opaque except the light transmitting hole arrays;

each light transmitting hole comprises a liquid crystal layer, and the left eye glass and the right eye glass alternately control voltages of the liquid crystal layers to control the each light transmitting hole of the left eye glass and the right eye glass to be sequentially opened according to the first predetermined time, wherein only one light transmitting hole of one of the left eye glass and the right eye glass is opened to receive light transmitted from one point of a corresponding data image in every time point so that distances of convergence and adjustment from the one point for the left eye glass and the right eye glass are equivalent to eliminate constantly repeating the convergence and the adjustment for a left eye and a right eye of the 3D shutter glasses.

2. The 3D shutter glasses according to claim 1, wherein both arrangements and amounts of the light transmitting hole arrays of the left eye glass and the right eye glass are the same.

3. The 3D shutter glasses according to claim 1, wherein shapes of the light transmitting holes comprise at least one of bar shaped empty slot, circular hole and square hole.

4. 3D shutter glasses, comprising a left eye glass and a right eye glass, wherein both the left eye glass and the right eye glass comprise a light transmitting hole array having a plurality of light transmitting holes, wherein the left eye glass and the right eye glass alternately control the plurality of light transmitting holes of the corresponding light transmitting hole array to be sequentially opened according to a first predetermined time to receive left eye data images and right eye data images, and the first predetermined time is a spacing interval of alternately sending the left eye data images and the right eye data images, wherein each light transmitting hole comprises a liquid crystal layer, and the left eye glass and the right eye glass alternately control voltages of the liquid crystal layers to control the each light transmitting hole of the left eye glass and the right eye glass to be sequentially opened according to the first predetermined time, wherein only one light transmitting hole of one of the left eye glass and the right eye glass is opened to receive light transmitted from one point of a corresponding data image in every time point so that distances of convergence and adjustment from the one point for the left eye glass and the right eye glass are equivalent to eliminate constantly repeating the convergence and the adjustment for a left eye and a right eye of the 3D shutter glasses.

5. The 3D shutter glasses according to claim 4, wherein the left eye glass and the right eye glass are opaque except the light transmitting hole arrays.

6. The 3D shutter glasses according to claim 4, wherein both arrangements and amounts of the light transmitting hole arrays of the left eye glass and the right eye glass are the same.

7. The 3D shutter glasses according to claim 4, wherein shapes of the light transmitting holes comprise at least one of bar shaped empty slot, circular hole and square hole.

8. A 3D display system, wherein the 3D display system comprises a 3D display device and 3D shutter glasses, the 3D display device is positioned in front of the 3D shutter glasses, employed to show 3D data images, and to alternately send left eye data images and right eye data images to the 3D shutter glasses according to a first predetermined time;

the 3D shutter glasses comprise a left eye glass and a right eye glass, wherein both the left eye glass and the right eye glass comprise a light transmitting hole array having a plurality of light transmitting holes, wherein the left eye glass and the right eye glass alternately control the plurality of light transmitting holes of the corresponding light transmitting hole array to be sequentially opened according to the first predetermined time to receive the left eye data images and the right eye data images, and the first predetermined time is a spacing interval of alternately sending the left eye data images and the right eye data images, wherein each light transmitting hole comprises a liquid crystal layer, and the left eye glass and the right eye glass alternately control voltages of the liquid crystal layers to control the each light transmitting hole of the left eye glass and the right eye glass to be sequentially opened according to the first predetermined time, wherein only one light transmitting hole of one of the left eye glass and the right eye glass is opened to receive light transmitted from one point of a corresponding data image in every time point so that distances of convergence and adjustment from the one point for the left eye glass and the right eye glass are equivalent to eliminate constantly repeating the convergence and the adjustment for a left eye and a right eye of the 3D shutter glasses.

9. The 3D display system according to claim 8, wherein the left eye glass and the right eye glass are opaque except the light transmitting hole arrays.

10. The 3D display system according to claim 8, wherein both arrangements and amounts of the light transmitting hole arrays of the left eye glass and the right eye glass are the same.

11. The 3D shutter glasses according to claim 8, wherein shapes of the light transmitting holes comprise at least one of bar shaped empty slot, circular hole and square hole.

\* \* \* \* \*